(12) United States Patent
Carlo

(10) Patent No.: US 12,093,874 B2
(45) Date of Patent: Sep. 17, 2024

(54) BATTERY SPECIFICATION LOOKUP AND AGGREGATION METHOD

(71) Applicant: CPS Technology Holdings LLC, New York, NY (US)

(72) Inventor: Michael Carlo, Sussex, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 17/727,989

(22) Filed: Apr. 25, 2022

(65) Prior Publication Data

US 2022/0327458 A1 Oct. 13, 2022

Related U.S. Application Data

(63) Continuation of application No. 16/642,315, filed as application No. PCT/US2018/049180 on Aug. 31, 2018, now Pat. No. 11,315,063.
(Continued)

(51) Int. Cl.
*G06Q 10/0639* (2023.01)
*G06F 16/955* (2019.01)
(Continued)

(52) U.S. Cl.
CPC ... *G06Q 10/06395* (2013.01); *G06F 16/9554* (2019.01); *G06K 7/10861* (2013.01);
(Continued)

(58) Field of Classification Search
CPC .......... G06F 16/9554; G06Q 10/06395; G06Q 10/087; G06K 7/10861; G06K 7/1413;
(Continued)

(56) References Cited

U.S. PATENT DOCUMENTS

2009/0228171 A1\* 9/2009 Goff ..................... G01R 31/371
701/33.4
2011/0273181 A1 11/2011 Park
(Continued)

FOREIGN PATENT DOCUMENTS

| CN | 101034140 A | 9/2007 |
| CN | 101976401 A | 2/2011 |

(Continued)

OTHER PUBLICATIONS

International Search Report and Written Opinion of the International Searching Authority dated Dec. 11, 2018 for International Appln. No. PCT/US2018/048180 filed Aug. 31, 2018, 11 pages.

*Primary Examiner* — Laura A Gudorf
(74) *Attorney, Agent, or Firm* — Boardman & Clark LLP

(57) ABSTRACT

Disclosed is a system for testing batteries, comprising: a battery tester comprising: a tester scanner or camera for capturing an obtained battery identifier; a tester network hardware for transmitting the obtained battery identifier; and a server comprising: a database having data, the data comprising at least one historic battery identifier and associated historic battery characteristic and configured to compare the data with the obtained battery identifier; wherein the battery tester is configured to capture a battery identifier from a battery and transmit the battery identifier to the server.

20 Claims, 2 Drawing Sheets

Related U.S. Application Data

(60) Provisional application No. 62/553,640, filed on Sep. 1, 2017.

(51) Int. Cl.
*G06K 7/10* (2006.01)
*G06K 7/14* (2006.01)
*G06K 19/06* (2006.01)
*G06Q 10/087* (2023.01)
*H04N 1/00* (2006.01)

(52) U.S. Cl.
CPC .......... *G06K 7/1413* (2013.01); *G06K 7/1417* (2013.01); *G06K 19/06028* (2013.01); *G06K 19/06037* (2013.01); *G06Q 10/087* (2013.01); *G06K 2007/10504* (2013.01); *H04N 1/00244* (2013.01); *H04N 1/00251* (2013.01)

(58) Field of Classification Search
CPC ........... G06K 7/1417; G06K 19/06028; G06K 19/06037; G06K 2007/10504; H04N 1/00244; H04N 1/00251
See application file for complete search history.

(56) References Cited

U.S. PATENT DOCUMENTS

| | | | |
|---|---|---|---|
| 2011/0300416 A1 | 12/2011 | Bertness | |
| 2012/0182132 A1* | 7/2012 | McShane | H02J 7/00047 |
| | | | 340/10.51 |
| 2014/0340231 A1 | 11/2014 | Stukenberg | |
| 2014/0374475 A1 | 12/2014 | Kallfelz | |
| 2016/0266212 A1 | 9/2016 | Carlo et al. | |

FOREIGN PATENT DOCUMENTS

| | | |
|---|---|---|
| CN | 105340290 A | 8/2014 |
| CN | 104166099 A | 11/2014 |
| KR | 10-1468309 | 11/2014 |

* cited by examiner

BATTERY SPECIFICATION LOOKUP AND AGGREGATION METHOD

CROSS-REFERENCE TO RELATED APPLICATIONS

This application is a Continuation of U.S. patent application Ser. No. 16/642,315, filed Feb. 26, 2020, entitled "BATTERY SPECIFICATION LOOKUP AND AGGREGATION METHOD", now U.S. Pat. No. 11,315,063, which is a National Stage Entry of PCT Patent Application Number PCT/US2018/049180, filed Aug. 31, 2018, entitled "BATTERY SPECIFICATION LOOKUP AND AGGREGATION METHOD", which claims priority to U.S. Provisional Patent Application No. 62/553,640 filed Sep. 1, 2017, the entireties of which are incorporated herein by reference.

FIELD

This application relates to the field of batteries. More specifically, this application relates to battery identification.

BACKGROUND

Battery testers are known, particularly battery testers for secondary batteries. Secondary batteries particularly for use in vehicles may be purchased from retailers, for example, automotive specialty stores or big-box stores. These same retailers may also allow for testing of batteries. Today, there are thousands of uniquely-branded batteries sold within the United States. The unique branding can be the result of unique brand names affiliated with certain retailers. Therefore, a battery having the same group size can be sold under a number of different brand names. In addition, the same group name battery may have multiple performance ratings.

At many retailers, the performance ratings of the battery may be used to differentiate between brand names. Therefore, batteries having lower cold crank amperes (CCA) rating may be sold as a value brand, while higher CCA rating with the same croup size may be sold as a good or premium brand. Thus, a specific group size say for example a 24F can be sold under different brand names. For example a 450 CCA 24F battery could be sold as a value brand, while a, 600 CCA 24F can be sold as a good brand, while a 750CC 24F can be sold as a premium brand. The retailer typically will distinguish between each of these products by registering a unique product SKU (Stock Keeping Unit) or UPC (Unit Product Code) for each product or other identifying system.

When batteries return to the retailer (for example, when a consumer brings the battery in due to issues with a vehicle) often a retailer will have battery test equipment that may be used to determine the health of the battery. The battery test equipment may obtain various parameters about the battery that will help determine the health of the battery. One parameter is the rated CCA of the battery.

Known battery test equipment used by retailers is typically used by a technician. Known battery test equipment typically requires the entry of certain data associated with the battery to be tested. For example, the cold cranking amperes (CCA) of the battery manufacturer specifications (for example, the expected CCA for a new battery) may be printed on the side of the battery. Typically, a technician will need to enter that CCA into the tester. In addition, the technician may need to enter additional information such as group size and reserve capacity of the manufacturer specifications (for example, the expected reserve capacity for a new battery), which likewise may be provided on the side of the battery. UPC or SKU may be accessible by scanning the battery, or may be manually entered as well.

Unfortunately, manual entry is prone to errors. For example, the technician may mistype the information, leading to bad data about the battery type. In addition, battery identifiers such as UPC and SKU may differ across retailers, which makes identification of the battery purely by a (substantially unique) identifier such as UPC or SKU difficult. For example, if a customer brought a battery into an auto parts store after purchasing the battery at a big box retailer, the identifier (such as UPC or SKU) may not be used to identify the battery. Therefore, unless the CCA, group size, and reserve capacity are accurately entered, replacement of the battery with a proper battery may be difficult.

In addition, because identifiers like SKU and UPC vary between retailers for batteries of similar group size (among other features), it can be difficult for battery producers to track market trends without relying on reports from individual retailers.

What is needed is a system and method for overcoming these deficiencies.

SUMMARY

Accordingly, an improved battery specification and lookup system is disclosed.

Disclosed is a system for testing batteries, comprising: a battery tester comprising: a tester scanner or camera for capturing an obtained battery identifier; a tester network hardware for transmitting the obtained battery identifier; and a server comprising: a database having data, the data comprising at least one historic battery identifier and associated historic battery characteristic and configured to compare the data with the obtained battery identifier; wherein the battery tester is configured to capture a battery identifier from a battery and transmit the battery identifier to the server. Further disclosed is a system for testing batteries comprising a battery having a battery identifier and battery characteristics. Further disclosed, is a system for testing batteries comprising wherein the battery tester further comprises testing hardware. Further disclosed is a system for testing batteries comprising wherein the battery identifier is displayed on the battery as a battery identifier designation comprising a two-dimensional barcode, QR code, SKU barcode, or UPC barcode. Further disclosed is a system for testing batteries comprising wherein the battery tester is configured to use the scanner or camera to capture the battery identifier using the battery identifier designation.

Disclosed is a method for testing batteries, the method comprising: obtaining a battery identifier using a battery tester; transmitting the battery identifier to a server; checking to see if the battery identifier is in a database of battery identifier data on the server; if the battery identifier is in the database on the server, correlating the battery identifier to battery data; transmitting the battery data to the tester; populating the tester with the battery data; and conducting a battery test using the battery tester. Further disclosed is a method for testing batteries comprising if the battery identifier is not on the database on the server, prompting the user to populate battery data manually to create new battery data. Further disclosed is a method for testing batteries comprising adding the new battery data to the database. Further disclosed is a method for testing batteries comprising obtaining battery test data using the battery tester, comparing the battery test data with the battery data and producing a result.

Disclosed is a system for providing battery health diagnostics, the system comprising: a battery tester comprising a scanner or camera, display, testing hardware, and network hardware, the battery tester in communication with a server comprising battery identifier data and battery characteristic data. Further disclosed is a system for testing batteries comprising further comprising a battery comprising an individual battery identifier and individual battery characteristics. Further disclosed is a system for testing batteries comprising wherein the tester captures the battery individual battery identifier using the scanner or camera and transmits the battery individual battery identifier to the server using the tester network hardware. Further disclosed is a system for testing batteries comprising wherein the server compares the battery individual battery identifier to the server battery identifier data. Further disclosed is a system for testing batteries comprising wherein the battery testing hardware captures battery health characteristics.

The system may allow for the logging of identifier data to provide necessary information to a tester. For example, in various embodiments, a technician may scan the SKU barcode or UPC barcode (or other machine-readable optical label such as QR code or 2d barcode) using a tester, the tester may provide the identifier such as SKU/UPC to a database, and if the SKU/UPC is present, battery information may then be provided to the tester (for example: CCA, group size, and reserve capacity). While previously, systems were prone to the errors outlined above, this system may facilitate timely and accurate battery testing.

In addition, the system may allow for machine learning, producing increased accuracy of data over time as the system is repeatedly used. For example, if the identifier (SKU/UPC) is not part of the database, or if the database requires additional data regarding the identifier (SKU/UPC), the tester may request the technician enter in the necessary information.

The system may also allow for timely information regarding certain usage characteristics across battery types, regardless of a retailer's SKU/UPC/identification. This can allow for current information regarding market need for particular battery types.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
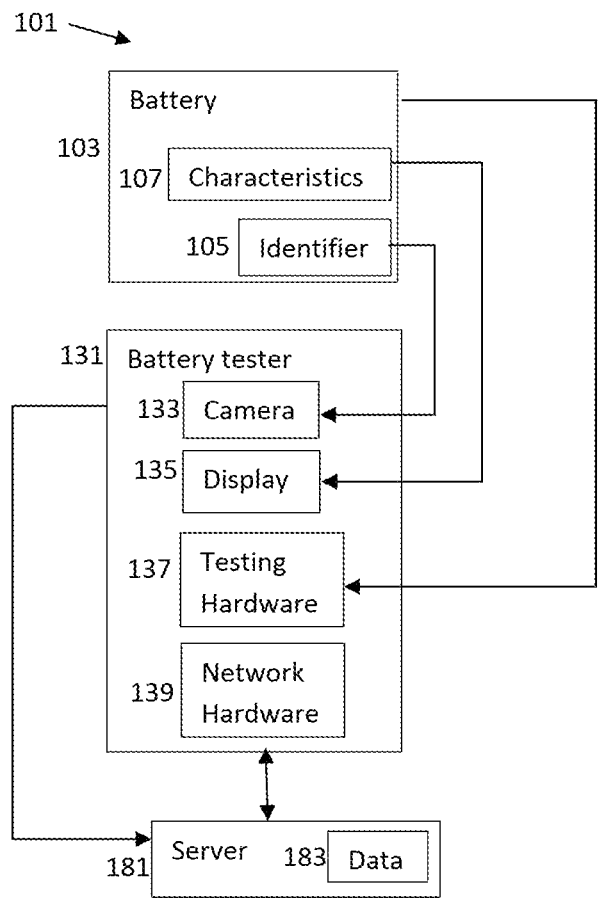
FIG. 1 is a diagram of components and interaction thereof of the system and method herein, according to various examples of embodiments.

Referring to FIG. 1, a diagram of components and interaction thereof of the system and method herein 101, according to various examples of embodiments, is disclosed. A battery 103, battery tester 131, and cloud server 181 are all shown. While three components are shown, additional components should be contemplated as within the scope of this disclosure. The battery tester 103 may be used to scan an identifier designation (such as SKU barcode or UPC barcode but could also include 2d barcode or QR code) provided on the battery which may provide the identifier (which may be an SKU code/number, UPC code/number, or the like) 105. The battery tester 131 may comprise hardware suitable for performing standard battery health tests, as well as the unique and novel components described herein. In various embodiments, the tester 131 may be equipped with a scanner (e.g., barcode scanner) or a camera 133. The scanner or camera 133 may be accessed by interaction with a user interface which may be provided, for example, on a display 135. The scanner or camera 133 may be used by the technician or other user of the battery tester 131 to obtain the identifier/SKU or UPC (for example, by scanning an identifier designation on the battery such as a barcode, 2d barcode, QR code, etc. having the SKU or UPC number) 105 provided on the battery 103.

The obtained SKU or UPC number (identifier 105) may be provided to a cloud server (or other suitable data storage and analysis mechanism) 181 by the tester 131. Therefore, the tester 131 may further comprise a data transmission mechanism (network hardware 139). For example, the tester 131 may include a wireless internet module or other hardware and software for accessing a network 139. In various embodiments, the network hardware 139 comprises a wired connection.

The tester 131 may be in communication with a server 181, in various embodiments. The server 181 may be a cloud storage device or cloud server, in various embodiments. The server 181 alternatively may comprise a local server or storage device. The server 181 may be provided with a database which may store data 183. The server 181 (or other suitable mechanism) may further send information back to the tester 131.

In addition, the tester 131 may comprise testing hardware 137 which may be used in a similar manner as known battery testing hardware to obtain actual battery health (tested battery data). In other words, the battery testing hardware 137 on the tester 131 may be connected to the battery 103 (for example to the battery terminals via known mechanisms) to test actual battery health.

The server 181 may be configured to receive information from the battery tester 131, for example, by way of network hardware similar to the mechanism described above. The server 181 may further comprise data 183 which may comprise battery identifiers 105 and battery characteristics 107 across a variety of batteries 103. In various embodiments, these may be understood as existing or historic battery identifiers 105 and existing or historic battery characteristics 107. In other words, the server, may house data 183 regarding a large number of batteries 103 and battery types, and may correlate battery identifiers 105 (for example, SKU/UPC) with battery characteristics 107 (for example, battery specifications such as CCA, CA, or AH of a battery, which may represent the manufacturer battery specifications).

The present disclosure relates to a battery tester 131 which may assist with preventive battery 103 maintenance and reduction of warranty costs. Since, typically, all batteries are sold with a UPC or SKU (identifier 105), a database 183 may be collected of all the relevant battery specifications based off of the identifier 105 (UPC) on the battery. When the battery identifier 105 embodied in a battery identifier designation (e.g. UPC barcode, QR code, SKU barcode, two-dimensional barcode) on the battery 103 is scanned (e.g. using tester 131 having scanner/camera 133) at the time of test, the user may pre-populate the battery specification information (e.g. data 107) (such as CCA or CA or AH of the battery) into the testing tool.

Figure 2:
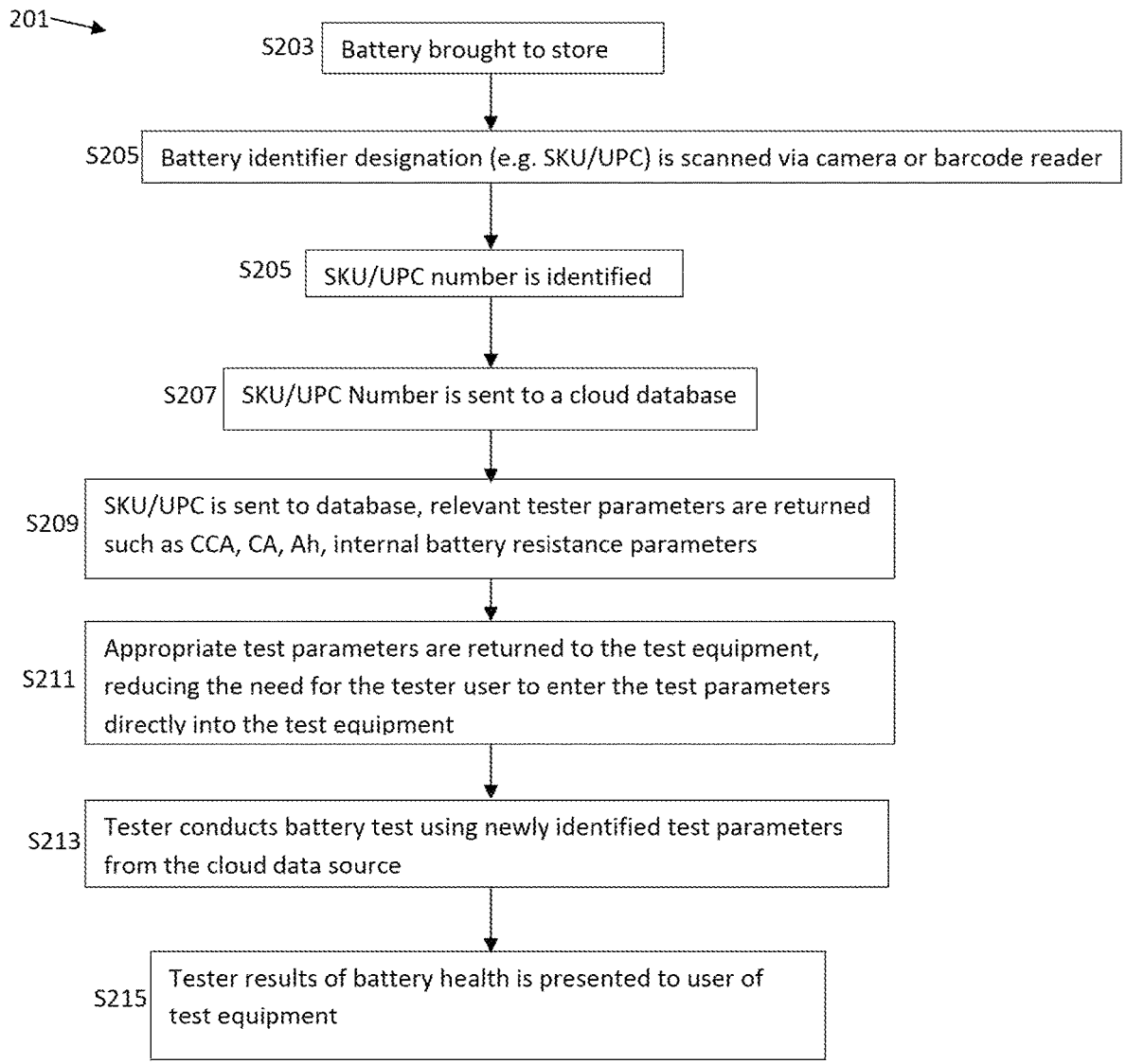
FIG. 2 is an algorithm or workflow for operation of the system and method herein, according to various examples of embodiments.

Referring to FIG. 2, an algorithm or workflow 201 for operation of the system and method herein, according to various examples of embodiments, is shown. The algorithm may be performed, in various embodiments, by a number of system components such as, but not limited to, those shown in FIG. 1.

First, in step S203, a user may bring a battery 103 to a battery tester 131 (for example, if the battery owner is experiencing vehicle performance issues suspected to be attributable to the battery). The battery tester 131 may be provided by a battery vendor, for example, a vehicle parts store, or other retailer. The tester 131 may be operated by a technician. In step S205, the technician (or other battery tester operator) may scan or capture a battery SKU/UPC barcode, QR code, 2d barcode, etc. (in other words a battery identifier designation). The tester 131 may scan or capture the battery identifier designation (SKU or UPC barcode, etc.) embodying the identifier 105 to obtain the identifier 105 using a camera or barcode reader 133, in various embodiments.

In step S205, the tester 131 may interpret or otherwise identify that the scanned item (e.g. SKU or UPC barcode, 2d barcode, QR code) is a SKU or UPC (battery identifier) 105. The software provided on the battery tester 103 for scanning or capturing the SKU/UPC in various embodiments may be programmed to understand the scanned or captured data as a SKU/UPC/identifier 105.

In step S207, the battery SKU or UPC (identifier 105) may next be sent by the tester 131 to a cloud database or cloud server (or like device for performing the functionality disclosed herein) 181, for example, using a data transmission mechanism provided on the scanner 131. In step S209, the SKU or UPC (identifier 105) may be used to interrogate a database of battery characteristics (data 183). The server 181 may evaluate the SKU/UPC (identifier 105) and determine the most probable battery 103 previously entered into the database 183. The correlated battery characteristics 107 for that particular battery 103 may be obtained. For example, the SKU or UPC (identifier 105) may be correlated with a manufacturer specification CCA (Cold Crank Amperes), CA (Cranking Amperes), AH (ampere hours), internal battery resistance parameters, brand, group size, etc.

If the SKU or UPC (identifier 105) is not found, or if the SKU or UPC (identifier 105) cannot be correlated with the data 183 with sufficient confidence (for example, if insufficient data points have been obtained), no data may be returned to the tester 131. In various embodiments, the system may look for a SKU/UPC matching the obtained value. If the SKU/UPC (identifier 105) does not exist, the system 201, for example server 181 may return an error or no value back to the tester 103.

In step S211, if the appropriate battery 103 and associated parameters or characteristics 107 are found as part of the data 183, the obtained parameters/characteristics 107 may be transmitted back to the testing device, in various embodiments. If the characteristics 107 are returned to the tester 103, the parameters/characteristics 107 may populate the tester 103. This may be, in various embodiments, in lieu of manual entry. In other words, the system 101, 201 may reduce the need for the tester operator to enter parameters directly into the test equipment 103. In various embodiments, all or less than all parameters may be returned in step S211. Fields which may be populated may include: brand, group size, CCA, CA, internal battery resistance parameters, and/or amp hours (all reflecting battery characteristics 105), in various embodiments. The technician may review the data provided to the tester 103, making changes as necessary. If changes are necessary (for example, populated CCA is incorrect), the changes may be sent back to the server 181. The changes may be considered as additional data points for the system. The data points may be used for future testing for example, as data 183).

Alternatively, if the SKU/UPC (identifier 105) is not found, no values on the tester 103 may be populated by the system 101 (automatically). Therefore, the technician may be prompted to enter data about the battery 105 (characteristics 107). In various embodiments, the user may be prompted to enter as much information about the battery 103 that is known (e.g. characteristics 105). The technician may provide all or less than all of the information prompted by the tester 103, in various embodiments. Data (characteristics 107) may be entered into the tester by way of a known input mechanism. The information (characteristics 107) as well as the SKU/UPC (identifier 105) may be sent by the tester 131 to the server 181 to be entered into the database as a future data point for testing.

Next, in step S213, the tester operator (technician) may test the battery 103 using the populated parameters (characteristics 107) (whether the parameters are populated manually or automatically). Known mechanisms for testing a battery (for example, evaluating battery capacity or health) may be used. In various embodiments, testing may be performed whether the information is entered manually or automatically populated. After the battery test is conducted, in step S215 the tester 131 may present a battery health assessment to the user, for example using a display 135. In various embodiments, this may include the comparison of the tested values against the populated battery health values (battery health values when the battery is new) (i.e. battery characteristics 107 which may be saved on the server 181 database 183).

The system and method herein may use machine learning to evaluate the quality of data provided in the database. In other words, the system may only keep values for the battery attributes that are within expected parameters. For example, if the server 181 may not provide a value to the tester until sufficient data points (server data 183) are obtained that are within a certain range. As one non-limiting example, an operator may be required to manually enter data until a number of data points (tests with manual entry) are collected that are within a certain tolerance (i.e. amps, group size number, whatever the case may be). The system may filter outliers in order to have data of a certain confidence level. The values may fit a normal distribution, in various embodiments. There may be a confidence value associated with the UPC/SKU battery characteristics 107. The confidence value may determine whether the system returns the battery characteristics value when a request for information (i.e. a scan from a battery tester) is made.

A customer may have a technician use the system and method herein in a number of contexts, including:
 a. To check a new battery on shelf,
 b. To evaluate the health of a battery the customer has removed from the vehicle, and/or
 c. To evaluate the health of a battery the customer drives up with battery in vehicle to be tested.

While certain parameters are listed herein, a variety of additional information may be useful to obtain about the battery, such as location (which may provide information about environment), vehicle, vendor, manufacturer, any other codes provided on the battery, etc. In various embodiments, the tester may also include location data such as GPS. The GPS may be used to identify the vendor or store, in one or more examples.

It should be understood the SKU or UPC itself may not contain the information for the battery (for example, battery CCA), but instead comprise a unique identifier. In various embodiments, group size, reserve capacity, and CCA may be known metrics for battery testing. The system and method herein may allow for acquisition and correlation of this and other battery data with SKU or UPC.

The system and method herein has various advantages. For example, currently, there is no known centralized repository for tracking all batteries with certain battery attributes. In addition, over time the number of UPCs/SKUs and battery parameters may change based upon the market need for a particular group size and CCA rating. Managing and keeping this data (repository, parameter changes, etc.) up to date may be an enormous task for an individual to keep current. Using the system and method herein, leveraging the test equipment in the field scanning UPCs or SKUs of batteries the database may be, in various embodiments, self-intelligent and may use mathematical methods to determine the most probable battery SKU/test parameters for each test, in various embodiments. By using this technology the tester accuracy may improve using the collective knowledge of all the users conducting tests on the test equipment. Known technology may rely only on one user to enter data into test equipment correctly. In contrast, the disclosed system and method herein may leverage the collective knowledge of all users of the test equipment to properly populate test equipment. The system may self-correct, allowing for convergence to the correct answer from the correction of false or incomplete data which may be the result of manual entry by technicians.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any algorithm, process, or method steps may be varied or re-sequenced according to alternative embodiments. Likewise, some algorithm or method steps described may be omitted, and/or other steps added. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

Aspects of the method described herein are implemented on a software system running on a computer system. To this end, the methods and system may be implemented in, or in association with, a general-purpose software package or a specific purpose software package. As a specific, non-limiting example, the device could be a battery tester in communication with a cloud storage database and/or mobile device.

The software system described herein may include a mixture of different source codes. The system or method herein may be operated by computer-executable instructions, such as but not limited to, program modules, executable on a computer. Examples of program modules include, but are not limited to, routines, programs, objects, components, data structures, and the like which perform particular tasks or implement particular instructions. The software system may also be operable for supporting the transfer of information within a network.

While the descriptions may include specific devices or computers, it should be understood the system and/or method may be implemented by any suitable device (or devices) having suitable computational means. This may include programmable special purpose computers or general-purpose computers that execute the system according to the relevant instructions. The computer system or portable electronic device can be an embedded system, a personal computer, notebook computer, server computer, mainframe, networked computer, workstation, handheld computer, as well as now known or future developed mobile devices, such as for example, a personal digital assistant, cell phone, smartphone, tablet computer, mobile scanning device, and the like. Other computer system configurations are also contemplated for use with the communication system including, but not limited to, multiprocessor systems, microprocessor-based or programmable electronics, network personal computers, minicomputers, smart watches, and the like. Preferably, the computing system chosen includes a processor suitable for efficient operation of one or more of the various systems or functions or attributes of the communication system described.

The system or portions thereof may also be linked to a distributed computing environment, where tasks are performed by remote processing devices that are linked through a communication network(s). To this end, the system may be configured or linked to multiple computers in a network including, but not limited to, a local area network, wide area network, wireless network, and the Internet. Therefore, information, content, and data may be transferred within the network or system by wireless means, by hardwire connection, or combinations thereof. Accordingly, the devices described herein communicate according to now known or future developed pathways including, but not limited to, wired, wireless, and fiber-optic channels.

In one or more examples of embodiments, data may be stored remotely (and retrieved by the application) or may be stored locally on a user's device in a suitable storage medium. Data storage may be in volatile or non-volatile memory. Data may be stored in appropriate computer-readable medium including read-only memory, random-access memory, CD-ROM, CD-R, CD-RW, magnetic tapes, flash drives, as well as other optical data storage devices. Data may be stored and transmitted by and within the system in any suitable form. Any source code or other language suitable for accomplishing the desired functions described herein may be acceptable for use.

Furthermore, the computer or computers or portable electronic devices may be operatively or functionally connected to one or more mass storage devices, such as but not limited to, a hosted database or cloud-based storage.

The system may also include computer-readable media which may include any computer-readable media or medium that may be used to carry or store desired program code that may be accessed by a computer. The invention can also be embodied as computer-readable code on a computer-readable medium. To this end, the computer-readable medium may be any data storage device that can store data. The computer-readable medium can also be distributed over a network-coupled computer system so that the computer-readable code is stored and executed in a distributed fashion.

The inevntion claimed is:

1. A system for testing batteries, comprising:
a battery health analyzer having a reader for an attainment of acquired data, including battery health data and external data, and a data analysis unit in communication with and in one-piece construction with the reader and having an access to at least one historical battery health data-configured to compare with the acquired data, with the data analysis unit having a first aspect housing the acquired data and a second aspect for receipt of the at least one historical battery health data, wherein the battery health analyzer is configured to acquire the acquired data from at least the battery and communicate the acquired data to the data analysis unit for a determination of a battery health of the battery; and
a display for viewing of the battery health.

2. The system of claim 1, further comprising a battery having the battery health data.

3. The system of claim 1, wherein the acquired data comprises a battery identification.

4. The system of claim 1, wherein the battery health analyzer further comprises a battery health analyzer hardware.

5. The system of claim 4, wherein the battery health analyzer hardware is structured to provide access to a data base.

6. The system of claim 5, wherein the data base comprises a storage for the at least one historical battery health data.

7. The system of claim 1, wherein a resultant of a comparison of at least one battery health data received from the battery and the at least one historical battery health data is the battery health.

8. The system of claim 1, further comprising a server electrically coupled to at least one battery health analyzer and housing the at least one historical battery health data, wherein the server is configured to receive the acquired data from the at least one battery health analyzer and provide to the at least one battery health analyzer the at least one historical battery health data, corresponding to the acquired data.

9. A method for testing batteries, the method comprising:
obtaining acquired data including a battery parameter and external data, with the battery parameter including battery health data, using a reader;
transmitting the acquired data to a data analysis unit, the data analysis unit in one-piece construction with the reader, having a first aspect and a second aspect;
determining the acquired data is in the first aspect;
correlating the acquired data to historical second data and evaluating the historical second data for specific historical second data where the acquired data is in the first aspect;
transmitting the historical second data to the second aspect;
populating the second aspect with the specific historical second data;
determining a battery health by a comparison of the acquired data to the specific historical second data; and
viewing the battery health on a display.

10. The method of claim 9, further comprising comparing the specific historical second data with a second battery parameter received from the battery to determine the battery health.

11. The method of claim 10, wherein the acquired data comprises a battery identification, and at least one of the second battery parameter and the specific historical second data comprise at least one battery health data.

12. The method of claim 9, further comprising electrically transmitting the acquired data between the reader to the first aspect.

13. The method of claim 9, further comprising determining the acquired data is housed in a database of the first aspect.

14. The method of claim 9, further comprising prompting a user to populate new historical second data manually where the acquired data is not housed in the first aspect.

15. The method of claim 14, further comprising adding the new historical second data to the first aspect.

16. The method of claim 9, further comprising electrically coupling a server to at least one data analysis unit housing the historical second data, wherein the server receives the acquired data from the at least one data analysis unit and provides to the at least one data analysis unit the historical second data, corresponding to the acquired data.

17. A system for providing battery health diagnostics, the system comprising:

a battery health analyzer comprising a reader, a display, and a data analysis unit electrically and physically coupled to one another in one-piece construction for a receipt of acquired data including tested battery data and external data, and a determination of a battery health of a battery, through a deduction of a relationship between the acquired data and an at least one historical data, having at least one battery health data, the data analysis unit having a first aspect housing the acquired data and a second aspect for receipt of the at least one historical data; and the display for viewing of the at least one battery health data.

18. The system of claim 17, wherein at least one of the acquired data comprises a battery identification, and the battery health analyzer captures the acquired data using the reader and transmits to the data analysis unit.

19. The system of claim 18, wherein the at least one historical data is stored in the data analysis unit, where the at least one historical data comprises the battery identification and at least one historical battery health data, with the battery health being a resultant of a comparison of the at least one historical battery health data with the at least one battery health data.

20. The system of claim 17, further comprising a server electrically coupled to at least one battery health analyzer and housing the at least one historical data, wherein the server is configured to receive the acquired data from the at least one battery health analyzer and provide to the at least one battery health analyzer the at least one historical data, corresponding to the acquired data, wherein the battery health analyzer determines the battery health through the deduction of the relationship between the acquired data and the at least one battery health data within parameters.

* * * * *